(12) United States Patent
Ko et al.

(10) Patent No.: US 11,527,800 B2
(45) Date of Patent: Dec. 13, 2022

(54) SECONDARY BATTERY

(71) Applicant: Samsung SDI Co., Ltd., Yongin-si (KR)

(72) Inventors: Sung Gwi Ko, Yongin-si (KR); Dae Kyu Kim, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 17 days.

(21) Appl. No.: 16/771,888

(22) PCT Filed: Dec. 13, 2017

(86) PCT No.: PCT/KR2017/014606
§ 371 (c)(1),
(2) Date: Jun. 11, 2020

(87) PCT Pub. No.: WO2019/117341
PCT Pub. Date: Jun. 20, 2019

(65) Prior Publication Data
US 2021/0074977 A1    Mar. 11, 2021

(51) Int. Cl.
*H01M 50/325* (2021.01)
*H01M 50/572* (2021.01)
(Continued)

(52) U.S. Cl.
CPC ....... *H01M 50/325* (2021.01); *H01M 50/166* (2021.01); *H01M 50/172* (2021.01); *H01M 50/572* (2021.01)

(58) Field of Classification Search
CPC ............. H01M 10/658; H01M 50/166; H01M 50/172; H01M 50/325; H01M 50/572
See application file for complete search history.

(56) References Cited

U.S. PATENT DOCUMENTS 10,090,497 B2    10/2018    Kim et al.
10,283,741 B2    5/2019    Kim et al.
(Continued)

FOREIGN PATENT DOCUMENTS

CN    107293687 A    10/2017
CN    107305936 A    10/2017
(Continued)

OTHER PUBLICATIONS

KR-20170012137-A English Machine Translation Generated from Espacenet on Aug. 24, 2021 (Year: 2017).*
(Continued)

*Primary Examiner* — Matthew T Martin
*Assistant Examiner* — Justin C. King
(74) *Attorney, Agent, or Firm* — Lewis Roca Rothgerber Christie LLP

(57) ABSTRACT

The present invention relates to a secondary battery which is capable of improving safety. As an example, a secondary battery which comprises an electrode assembly; a case which accommodates the electrode assembly; a cap assembly which is coupled to an upper portion of the case, and a gasket which is interposed between the cap assembly and the case, wherein the cap assembly comprises a cap-up, a safety vent which is installed at a lower portion of the cap-up, a cap-down which is installed at a lower portion of the safety vent, an insulator which is interposed between the safety vent and the cap-down, and a sub-plate which is located on a lower surface of the cap-down, and an insulation layer is formed on one surface of the safety vent, is disclosed.

9 Claims, 3 Drawing Sheets

(51) Int. Cl.
*H01M 50/172* (2021.01)
*H01M 50/166* (2021.01)

(56) References Cited

U.S. PATENT DOCUMENTS

| | | | |
|---|---|---|---|
| 10,586,963 B2 | 3/2020 | Lee et al. | |
| 2009/0142660 A1* | 6/2009 | Hori | H01M 10/643 |
| | | | 429/174 |
| 2010/0151282 A1* | 6/2010 | Koh | H01M 50/155 |
| | | | 429/7 |
| 2010/0159310 A1* | 6/2010 | Kim | H01M 50/3425 |
| | | | 429/72 |
| 2015/0194644 A1* | 7/2015 | Jung | H01M 50/171 |
| | | | 429/56 |
| 2016/0028058 A1* | 1/2016 | Kim | H01M 50/578 |
| | | | 429/82 |
| 2017/0155105 A1* | 6/2017 | Kim | H01M 50/578 |
| 2017/0294635 A1 | 10/2017 | Kim et al. | |
| 2017/0309881 A1 | 10/2017 | Lee et al. | |

FOREIGN PATENT DOCUMENTS

| | | | | |
|---|---|---|---|---|
| EP | 3696873 | A1 | 8/2020 | |
| KR | 10-2016-0035424 | A | 3/2016 | |
| KR | 10-2016-0051037 | A | 5/2016 | |
| KR | 10-2016-0144016 | A | 12/2016 | |
| KR | 20160144016 | A * | 12/2016 | .......... H01M 50/531 |
| KR | 20160144016 | A * | 12/2016 | |
| KR | 10-2017-0012137 | A | 2/2017 | |
| KR | 10-2017-0061423 | A | 6/2017 | |
| KR | 10-2017-0121636 | A | 11/2017 | |
| KR | 10-2017-0124343 | A | 11/2017 | |

OTHER PUBLICATIONS

EPO Extended European Search Report dated May 21, 2021, issued in corresponding European Patent Application No. 17934972.5 (6 pages).
CN Office Action dated Mar. 11, 2022, corresponding to CN Patent Application No. 201780098163.X; 7 pages.

* cited by examiner

SECONDARY BATTERY

CROSS-REFERENCE TO RELATED APPLICATION(S)

This application is a National Phase Patent Application of International Patent Application Number PCT/KR2017/014606, filed on Dec. 13, 2017. The entire contents of which are incorporated herein by reference.

TECHNICAL FIELD

The present invention relates to a secondary battery.

BACKGROUND ART

A secondary battery may have an increased internal pressure due to an increase in the internal temperature and generation of gases due to an abnormal state, such as short-circuiting or over-charging.

For example, if a lithium secondary battery is over-charged, an electrolyte may be decomposed to release gases, such as carbon dioxide or carbon monoxide, resulting in an increase in the internal pressure of the battery. In addition, if over-current flows through the battery due to over-discharging or short-circuiting, the internal temperature of the battery may rise, and thus the electrolyte may be converted into gases. Accordingly, the internal pressure and temperature may increase, causing safety-related problems, such as ignition, thereby raising significant safety concerns and considerably deteriorating battery performance and life characteristics.

DESCRIPTION OF EMBODIMENTS

Technical Problem

The present invention provides a secondary battery which is capable of improving safety.

Solution to Problem

In a secondary battery according to the present invention, which comprises an electrode assembly, a case which accommodates the electrode assembly, a cap assembly which is coupled to an upper portion of the case, and a gasket which is interposed between the cap assembly and the case, the cap assembly comprises a cap-up, a safety vent which is installed at a lower portion of the cap-up, a cap-down which is installed at a lower portion of the safety vent, an insulator which is interposed between the safety vent and the cap-down, and a sub-plate which is located on a lower surface of the cap-down, and an insulation layer is formed on one surface of the safety vent.

In addition, the insulation layer may be formed by performing anodizing treatment on one surface of the safety vent.

Here, the insulation layer may be made of aluminum oxide.

In addition, edges of the safety vent may upwardly extend to an upper portion of the cap-up to encompass edges of the cap-up.

In addition, the safety vent may include a first surface contacting the cap-up and a second surface opposite to the first surface, and the insulation layer is formed on the second surface.

In addition, the insulation layer may be positioned between the safety vent and the gasket.

In addition, a protrusion part that downwardly protrudes may be formed at the center of the safety vent, and the protrusion part may be electrically connected to the sub-plate.

In addition, the insulation layer formed at a portion of the safety vent, where the insulator and the sub-plate are coupled to the safety vent, may be removed.

In addition, the insulation layer may insulate the safety vent and the case from each other.

In addition, the electrode assembly may include a first electrode, a second electrode and a separator interposed between the first electrode and the second electrode, the safety vent may be electrically connected to the first electrode through the sub-plate, and the case may be electrically connected to the second electrode.

Advantageous Effects of Invention

As described above, in the secondary battery according to an embodiment, the insulation layer is formed on an external surface of the safety vent, thereby insulating the safety vent and the case from each other even if the gasket is burnt or melt by heat generated by an internal short circuit.

MODE OF INVENTION

Hereinafter, example embodiments of the present invention will be described in detail.

Various embodiments of the present invention may be embodied in many different forms and should not be construed as being limited to the example embodiments set forth herein. Rather, these example embodiments of the invention are provided so that this invention will be thorough and complete and will convey inventive concepts of the invention to those skilled in the art.

In addition, in the accompanying drawings, sizes or thicknesses of various components are exaggerated for brevity and clarity. Like numbers refer to like elements throughout. As used herein, the term "and/or" includes any and all combinations of one or more of the associated listed items.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the secondary battery in the figures is turned over, elements described as "below" or "beneath" other elements or features would then be oriented "above" or "over" the other elements or features. Thus, the term "below" may encompass both an orientation of above and below.

Figure 1:
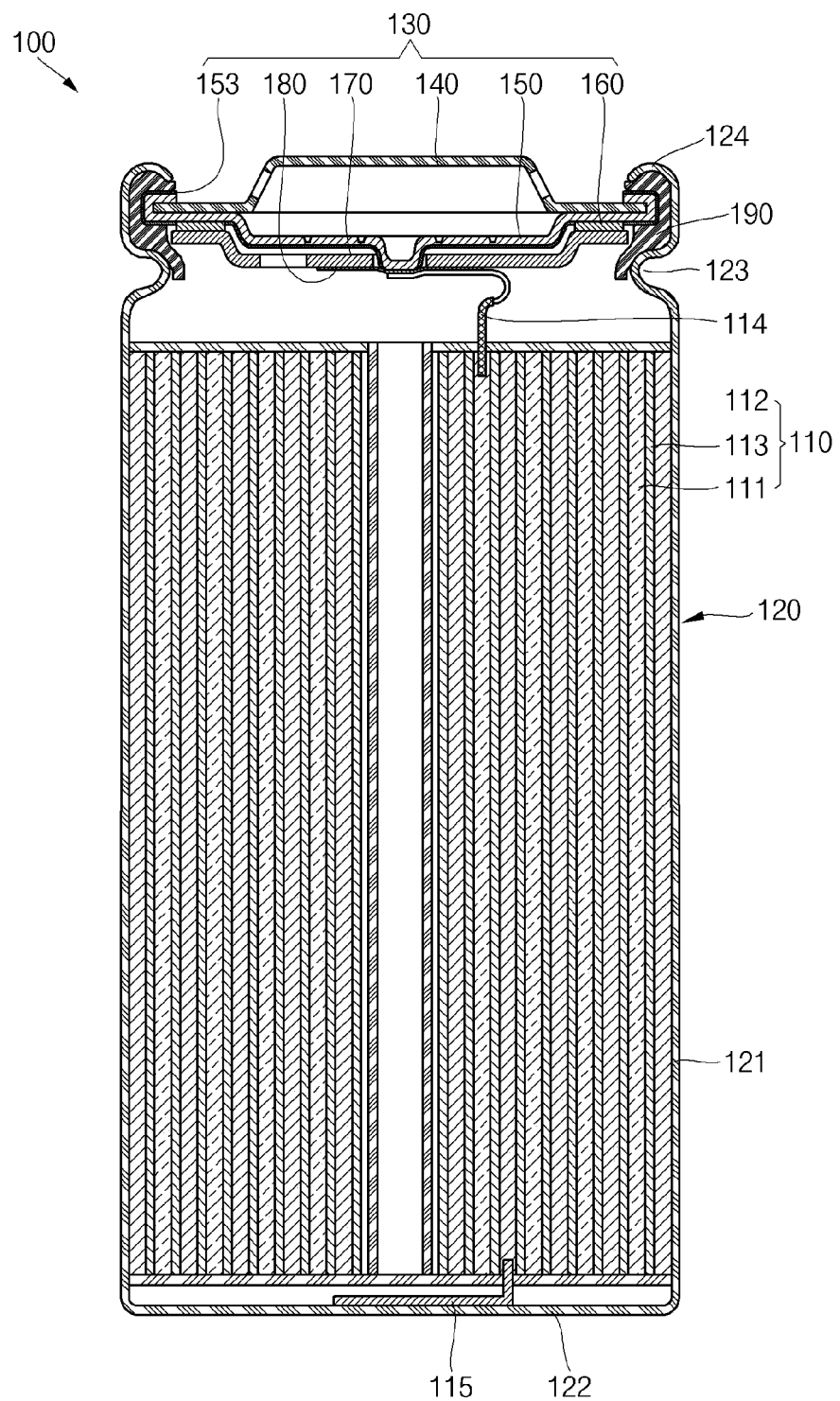
FIG. 1 is a cross-sectional view of a secondary battery according to an embodiment.
Figure 2:
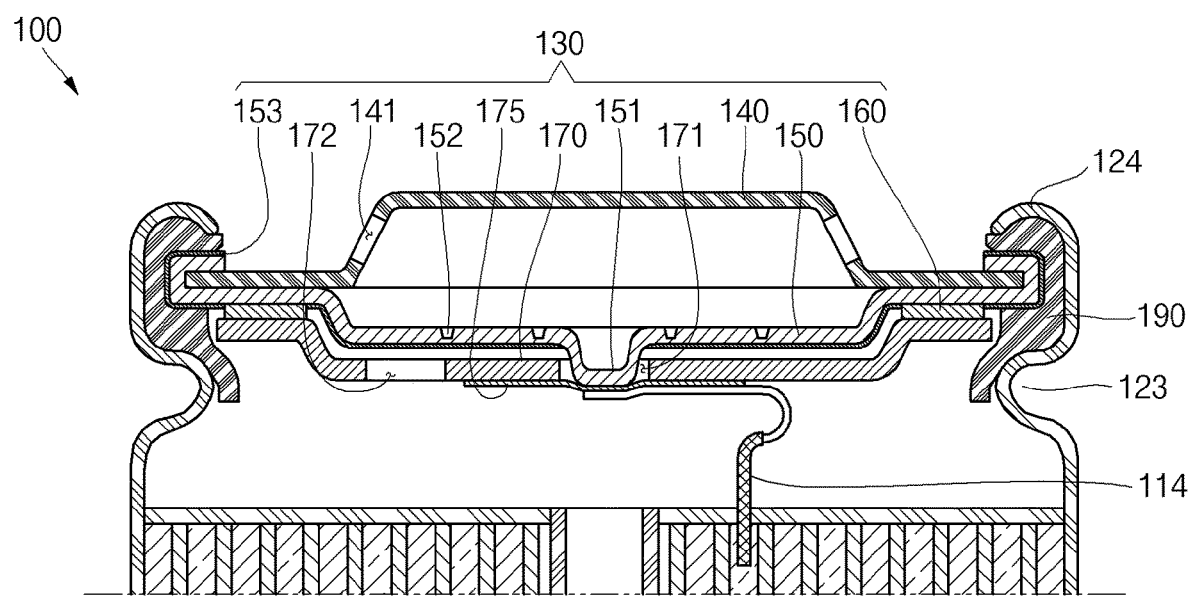
FIG. 2 is an enlarged cross-sectional view illustrating a cap assembly shown in FIG. 1.

FIG. 1 is a cross-sectional view of a secondary battery according to an embodiment. FIG. 2 is an enlarged cross-sectional view illustrating a cap assembly shown in FIG. 1.

Referring to FIGS. 1 and 2, the secondary battery according to an embodiment includes an electrode assembly 110, a case 120 accommodating the electrode assembly 110, a cap assembly 130 coupled to a top opening of the case 120, and a gasket 190 sealing the case 120 and the cap assembly 130.

The electrode assembly 110 includes a first electrode 111, a second electrode 112 and a separator 113 interposed between the first electrode 111 and the second electrode 112. The electrode assembly 110 may be formed by winding a stacked structure including the first electrode 111, the separator 113 and the second electrode 112 in a jelly-roll configuration. Here, the first electrode 111 may function as a positive electrode and the second electrode 112 may function as a negative electrode.

The first electrode 111 is formed by coating a first electrode active material, such as a transition metal oxide, on a first electrode collector comprising a metal foil, such as an aluminum foil. A first electrode tab 114 is attached to the first electrode 111. One end of the first electrode tab 114 is electrically connected to the first electrode 111 and the other end of the first electrode tab 114 is upwardly protruded from the electrode assembly 110 to then be electrically connected to the cap assembly 130.

The second electrode 112 is formed by coating a second electrode active material, such as graphite or carbon, on a second electrode collector comprising a metal foil, such as a nickel or copper foil. A second electrode tab 115 is attached to the second electrode 112. One end of the second electrode tab 115 is electrically connected to the second electrode 112 and the other end of the second electrode tab 115 is downwardly protruded from the electrode assembly 110 to then be electrically connected to a bottom surface plate 122 of the case 120.

The separator 113 is disposed between the first electrode plate 111 and the second electrode plate 112 to prevent a short circuit and allow movement of lithium ions. The separator 113 may comprise a polyethylene film, a polypropylene film, or a composite film including polyethylene and polypropylene.

The case 120 has a side surface plate 121, which is a cylindrical body having a predetermined diameter to form a space for accommodating the electrode assembly 110, and the bottom surface plate 122 sealing a bottom portion of the side surface plate 121. The top opening of the case 120 is opened to be sealed after the electrode assembly 110 is inserted into the case 120. In addition, a beading part 123 for preventing movement of the electrode assembly 110 is formed at a top portion of the case 120. In addition, a crimping part 124 for fixing the cap assembly 130 and the gasket 190 is formed at a topmost end of the case 120. The crimping part 124 is formed in a substantially round shape in a forming process for fixing the cap assembly 130 and the gasket 190.

The cap assembly 130 includes a cap-up 140, a safety vent 150 installed under the cap-up 140, a cap-down 170 installed under the safety vent 150, an insulator 160 interposed between the safety vent 150 and the cap-down 170, and a sub-plate 180 fixed on a bottom surface of the cap-down 170 to be electrically connected to the first electrode tab 114.

The cap-up 140 has a convexly formed top portion to be electrically connected to an external circuit. The cap-up 140 has a gas discharge hole 141 formed therein to provide a path through which gases generated in the case 120 are discharged. The cap-up 140 is electrically connected to the electrode assembly 110 and transmits the current generated from the electrode assembly 110 to the external circuit.

The safety vent 150 is shaped of a circular plate body corresponding to the cap-up 140 and has a protrusion part 151 downwardly protruding at its center. The safety vent 150 is electrically connected to the sub-plate 180 fixed to the bottom surface of the cap-down 170 using the protrusion part 151 passing through the throughhole 171 of the cap-down 170. Here, the protrusion part 151 of the safety vent 150 and the sub-plate 180 may be welded to each other by laser welding, ultrasonic welding, resistance welding or equivalents thereof. In addition, a notch 152 is formed at an outer circumference of the protrusion part 151 to guide rupturing of the safety vent 150. Additionally, an insulation layer 153 is formed on a surface of the safety vent 150. The insulation layer 153 insulates the case 120 and the safety vent 150 from each other. The insulation layer 153 will later be described in more detail.

The safety vent 150 is installed to make close contact with a portion of the cap-up 140, except for an upwardly protruding portion of the cap-up 140. That is to say, the outer circumferences of the safety vent 150 and the cap-up 140 are brought into contact each other. In addition, edges of the safety vent 150 may upwardly extend to an upper portion of the cap-up 140 while encompassing the cap-up 140. The safety vent 150 allows internal gases to be discharged while cutting off the current when an abnormal internal pressure is generated from the case 120. If the internal pressure of the case 120 exceeds an operating pressure of the safety vent 150, the protrusion part 151 of the safety vent 150 upwardly protrudes by the gases discharged through the gas discharge hole 172 of the cap-down 170 to then be electrically disconnected from the sub-plate 180. Here, the safety vent 150 is electrically disconnected from the sub-plate 180 as a portion of the sub-plate 180 welded to the protrusion part 151 is broken. Then, when the internal pressure of the case 120 exceeds a rupture pressure, which is higher than the operating pressure of the safety vent 150, the notch 152 is ruptured, thereby preventing explosion of the secondary battery 100.

The insulator 160 is interposed between the safety vent 150 and the cap-down 170 and insulates the safety vent 150 and the cap-down 170 from each other. The insulator 160 may comprise a resin material, such as polyethylene (PE), polypropylene (PP), or polyethylene terephthalate (PET).

The cap-down 170 is shaped of a circular plate body. A throughhole 171 is formed at the center of the cap-down 170, and the protrusion part 151 of the safety vent 150 passes through the throughhole 171. In addition, a gas discharge hole 172 is formed at one side of the cap-down 170 and allows internal gases to be discharged when excessive internal pressure is generated from the case 120.

The sub-plate 180 is positioned under the cap-down 170. The sub-plate 180 is welded between the protrusion part 151 of the safety vent 150 passing through the throughhole 171 of the cap-down 170 and the first electrode tab 114. Accordingly, the sub-plate 180 electrically connects the first electrode tab 114 and the safety vent 150 to each other.

The gasket 190 is installed in the top opening of the case 120. That is to say, the gasket 190 is assembled between outer circumferences of the safety vent 150 and the top opening of the case 120. The gasket 190 may prevent the case 120 and the cap assembly 130 from being separated from each other.

Figure 3A:
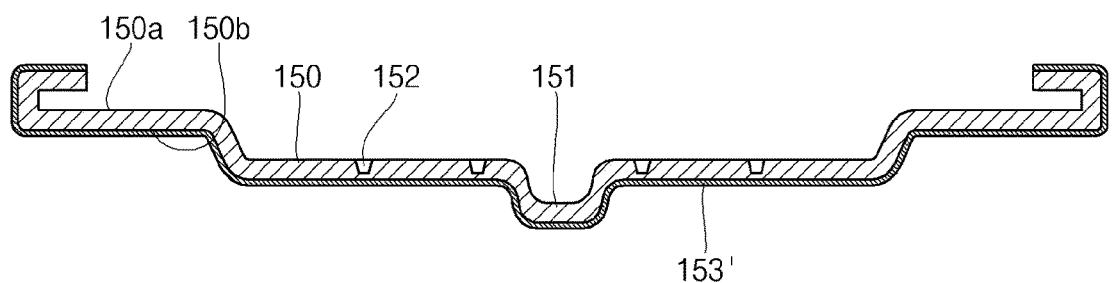
FIGS. 3A and 3B are cross-sectional views illustrating a method of forming an insulating layer in a safety vent in the secondary battery according to an embodiment.
Figure 3B:
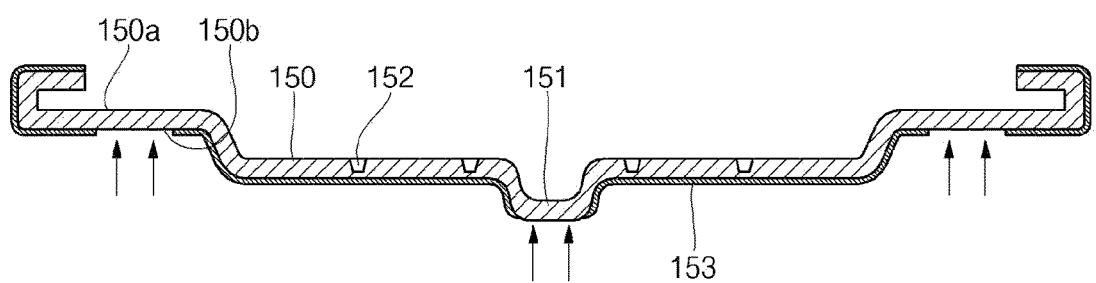
Figure 4:
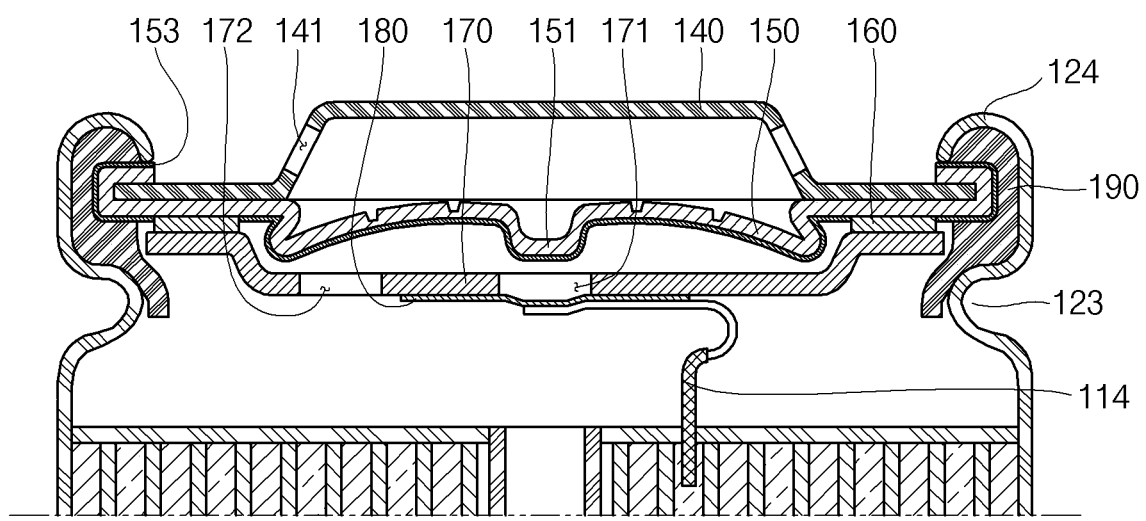
FIG. 4 is a cross-sectional view illustrating a state in which a safety vent is actuated due to occurrence of an electrical short in the secondary battery according to an embodiment.

FIGS. 3A and 3B are cross-sectional views illustrating a method of forming an insulating layer in a safety vent in the secondary battery according to an embodiment. FIG. 4 is a cross-sectional view illustrating a state in which a safety vent is actuated due to occurrence of an electrical short in the secondary battery according to an embodiment.

Referring to FIGS. 3A and 3B, the insulation layer 153 is formed on one surface of the safety vent 150. In addition, as illustrated in FIG. 2, the safety vent 150 is installed to make close contact with the portion of the cap-up 140, except for the upwardly protruding portion of the cap-up 140, and the edges of the safety vent 150 upwardly extend to the upper portion of the cap-up 140 while encompassing the cap-up 140. The safety vent 150 includes a first surface 150a contacting the cap-up 140 and a second surface 150b opposite to the first surface 150a, and the insulation layer 153 is formed on the second surface 150b. That is to say, the insulation layer 153 is formed on the outer surface (that is, the second surface 150b) of the safety vent 150, which encompasses the cap-up 140. In addition, since the edges of the safety vent 150 upwardly extend to the upper portion of the cap-up 140, the insulation layer 153 formed at the edges of the safety vent 150 is bent from edges of the cap-up 140 to then extend to an upper portion of the cap-up 140.

The insulation layer 153 is formed between the safety vent 150 and the gasket 190. That is to say, from the viewpoint of the center of the cap assembly 130, various elements are outwardly positioned in an order in which the cap-up 140, the safety vent 150, the insulation layer 153, the gasket 190, and the case 120 are sequentially arranged. Therefore, the insulation layer 153 may insulate the safety vent 150 and the case 120 from each other even if the gasket 190 is burnt or melted.

The insulation layer 153 may be formed by performing anodizing treatment on the second surface 150b of the safety vent 150. Here, the anodizing treatment refers to a process of forming an oxide layer by oxidizing a surface of a metal plate. In general, the most typical material employed in the anodizing treatment is aluminum (Al). In addition, the anodizing treatment may also be performed on a metallic material, such as manganese (Mn), zinc (Zn), titanium (Ti), hafnium (Hf) or niobium (Nb). The oxide layer is very hard and has excellent resistance to corrosion and wear. For example, if the safety vent 150 made of aluminum is suspended in an electrolytic solution and current is applied to the electrolytic solution, a surface of the safety vent 150 reacts with oxygen of the electrolytic solution to then be gradually oxidized and aluminum oxide ($Al_2O_3$), i.e., the insulation layer 153, is formed on the oxidized portion. In addition, since the insulation layer 153 is formed only on the second surface 150b of the safety vent 150, it may not be exposed to the electrolyte by forming a mask pattern the first surface 150a of the safety vent 150 before the anodizing treatment is performed. In addition, as illustrated in FIG. 3B, a portion of the insulation layer 153 is removed by laser or etching. Here, the removed portion of the insulation layer 153 is a portion where the insulator 160 and the sub-plate 180 are welded to the safety vent 150.

In general, if a short circuit occurs to the secondary battery 100, the internal pressure may rise so that internal gases of the secondary battery 100 are discharged through the gas discharge hole 172 of the cap-down 170. Here, the protrusion part 151 of the safety vent 150 upwardly protrudes by the discharged gases, thereby electrically disconnecting the safety vent 150 from the sub-plate 180 to cut off the flow of current. However, a short circuit may occur between the safety vent and the case because the gasket positioned between the safety vent and the case is burnt or melted by the heat generated during the short circuit of the secondary battery. According to the embodiments, as illustrated in FIG. 4, the insulation layer 153 is formed on the outer surface (that is, the second surface 150b) of the safety vent 150, and thus the safety vent 150 and the case 120 may be insulated from each other by the insulation layer 153 even if the gasket 190 is burnt or melted by the heat generated due to the short circuit occurring to the secondary battery 100. Therefore, the secondary battery 100 according to the embodiments can perfectly cut off the current flowing therein when the short circuit occurs, thereby improving the safety of the secondary battery 100.

Although the foregoing embodiments have been described to practice the secondary battery of the present invention, these embodiments are set forth for illustrative purposes and do not serve to limit the invention. Those skilled in the art will readily appreciate that many modifications and variations can be made, without departing from the spirit and scope of the invention as defined in the appended claims, and such modifications and variations are encompassed within the scope and spirit of the present invention.

The invention claimed is:

1. A secondary battery comprising:
   an electrode assembly;
   a case accommodating the electrode assembly;
   a cap assembly coupled to an upper portion of the case, and comprising:
      a cap-up;
      a safety vent at a lower portion of the cap-up;
      a cap-down at a lower portion of the safety vent;
      an insulator between the safety vent and the cap-down, and contacting one surface of the safety vent; and
      a sub-plate on a lower surface of the cap-down,
   a gasket between the cap assembly and the case; and
   an insulation layer contacting inner and outer peripheral surfaces of the insulator, and contacting the one surface of the safety vent
   wherein the insulation layer defines a gap or hole therein at a portion of the safety vent at which the insulator contacts the safety vent.

2. The secondary battery of claim 1, wherein the insulation layer comprises an anodized surface on the safety vent wherein the insulation layer defines a gap or hole therein at a portion of the safety vent at which the insulator contacts the safety vent.

3. The secondary battery of claim 2, wherein the insulation layer comprises aluminum oxide.

4. The secondary battery of claim 1, wherein edges of the safety vent upwardly extend to an upper portion of the cap-up to encompass edges of the cap-up.

5. The secondary battery of claim 1, wherein the safety vent comprises a first surface contacting the cap-up, and a second surface opposite to the first surface, and
   wherein the insulation layer is formed on the second surface.

6. The secondary battery of claim 1, wherein the insulation layer is between the safety vent and the gasket.

7. The secondary battery of claim 1, further comprising a protrusion part that downwardly protrudes at a center of the safety vent, and that is electrically connected to the sub-plate.

8. The secondary battery of claim 1, wherein the insulation layer insulates the safety vent and the case from each other.

9. The secondary battery of claim 1, wherein the electrode assembly comprises a first electrode, a second electrode, and a separator between the first electrode and the second electrode,
   wherein the safety vent is electrically connected to the first electrode through the sub-plate, and
   wherein the case is electrically connected to the second electrode.

* * * * *

UNITED STATES PATENT AND TRADEMARK OFFICE
CERTIFICATE OF CORRECTION

PATENT NO. : 11,527,800 B2
APPLICATION NO. : 16/771888
DATED : December 13, 2022
INVENTOR(S) : Sung Gwi Ko et al.

It is certified that error appears in the above-identified patent and that said Letters Patent is hereby corrected as shown below:

In the Claims
Column 6, Claim 2, Line 45-48   Delete "vent wherein the insulation layer defines a gap or hole therein at a portion of the safety vent at which the insulator contacts the safety vent."
Insert --vent.--.

Signed and Sealed this
Thirtieth Day of July, 2024

*Katherine Kelly Vidal*

Katherine Kelly Vidal
*Director of the United States Patent and Trademark Office*